United States Patent
Bouchy et al.

(10) Patent No.: US 7,237,959 B2
(45) Date of Patent: Jul. 3, 2007

(54) BREAKABLE COUPLING SYSTEM FOR A TURBOJET FAN SHAFT

(75) Inventors: Gael Bouchy, La Chapelle Iger (FR); Bertrand Jean-Joseph Marie Heurtel, Vert Saint-Denis (FR); Eric Jean Masson, Le Chatelet en Brie (FR); Bien-Aime Rakotondrainibe, Arbonne la Foret (FR); Pierre Pandelakis, Melun (FR); Daniel Martin, Bombon (FR); Patrick Morel, Chartrettes (FR); Henry Souyeaux, Yerres (FR)

(73) Assignee: Snecma Moteurs, Paris (FR)

( * ) Notice: Subject to any disclaimer, the term of this patent is extended or adjusted under 35 U.S.C. 154(b) by 175 days.

(21) Appl. No.: 10/500,863

(22) PCT Filed: Oct. 24, 2002

(86) PCT No.: PCT/FR02/03644

§ 371 (c)(1),
(2), (4) Date: Feb. 8, 2005

(87) PCT Pub. No.: WO03/038241

PCT Pub. Date: May 8, 2003

(65) Prior Publication Data

US 2005/0117828 A1    Jun. 2, 2005

(30) Foreign Application Priority Data

Oct. 31, 2001  (FR) ................................. 01 14099
Mar. 14, 2002  (FR) ................................. 02 03150

(51) Int. Cl.
  *F16C 19/08*    (2006.01)
(52) U.S. Cl. ...................... 384/445; 384/490; 384/624; 384/542

(58) Field of Classification Search ................ 384/445, 384/490, 624, 542
See application file for complete search history.

(56) References Cited

U.S. PATENT DOCUMENTS

| | | | |
|---|---|---|---|
| 3,395,857 A | 8/1968 | George et al. | |
| 5,417,501 A | 5/1995 | Hyde et al. | |
| 6,009,701 A | 1/2000 | Freeman et al. | |
| 6,098,399 A | 8/2000 | Richards et al. | |

FOREIGN PATENT DOCUMENTS

| | | |
|---|---|---|
| EP | 1 008 726 | 6/2000 |
| FR | 2 752 024 | 2/1998 |

*Primary Examiner*—Lenard A. Footland
(74) *Attorney, Agent, or Firm*—Oblon, Spivak, McClelland, Maier & Neustadt, P.C.

(57) ABSTRACT

The invention relates to a rotary shaft arrangement carrying equipment at one end and extending rearwards from the equipment, the shaft (1) being supported by a first bearing (2) behind the equipment, and by a second bearing (3) behind the first bearing (2), the first bearing (2) being carried by a casing (4) surrounding the shaft (1) and extending rearwards from the first bearing (2) to a stator structure (5) to which the casing (4) is fastened by screws (6) that extend parallel to the shaft (1) and that are fusible in traction, the arrangement being characterized by the fact that the second bearing (3) is disposed with radial clearance (J) in a bore (7) of an annular support (8) secured to the stator structure (5), and is fastened to said annular support (8) by screws (9) that are parallel to the shaft (1) and that are fusible in shear, whereby the second bearing (3) can bear against said support (8) in the event of said screws (9) rupturing. The invention relates more particularly to the support for the fan shaft of a turbojet.

13 Claims, 2 Drawing Sheets

BREAKABLE COUPLING SYSTEM FOR A TURBOJET FAN SHAFT

The invention relates to a shaft support that breaks on the appearance of unbalance.

More precisely, the invention relates to a rotary shaft arrangement carrying equipment at one end and extending rearwards from the equipment, the shaft being supported by a first bearing behind the equipment, and by a second bearing behind the first bearing, the first bearing being carried by a casing surrounding the shaft and extending rearwards from the first bearing to a stator structure to which the casing is fastened by screws that extend parallel to the shaft and that are fusible in traction.

Such an arrangement is described in FR 2 752 024. By way of example, the equipment is a turbojet fan driven and supported by the shaft of a low-pressure turbine.

If a blade of the fan breaks, a large unbalance occurs on the fan-support shaft, thereby generating cyclical loads and vibration that the first bearing of the shaft support communicates to the stationary portions of the machine, with a high risk of causing damage. Rupture of the screws that are fusible in traction leads to the casing becoming uncoupled some small number of shaft revolutions after a large unbalance appears, e.g. due to a blade of the fan breaking.

Once the casing has become uncoupled, the first bearing no longer supports the fan, and the fan shaft is supported only by the second bearing which in turn begins to transmit cyclical loads and vibration to the stator structure via its support.

FR 2 752 024 provides for an embodiment in which the annular support of the second bearing is connected to the support casing of the first bearing. In the event of the screws that are fusible in traction rupturing, the front end of the low-pressure shaft line becomes floating, and can oscillate quite strongly in the radial direction, and might rub against the high-pressure shaft line that is coaxial therewith and rotates at a significantly higher speed, which can lead to damage in both shaft lines.

FR 2 752 024 also makes provision for limiting the travel of the low-pressure shaft line after rupture of the screws that are fusible in traction by mounting a rib on the stator around the casing so as to contain its movement, or another rib fixed to the stator and terminated by shoes situated behind the second bearing and surrounding the low-pressure shaft line at a small distance therefrom. When the travel of the low-pressure shaft is limited by the shoes of the other rim, situated at a small distance from the shaft, friction naturally occurs between the low-pressure shaft and the shoes, which can damage the low-pressure shaft.

The object of the invention is to propose a shaft arrangement as defined in the introduction, which mitigates the above-mentioned drawbacks.

The invention achieves this object by the fact that the second bearing is disposed with radial clearance in a bore of an annular support secured to the stator structure, and is fastened to said annular support by screws that are parallel to the shaft and that are fusible in shear, whereby the second bearing can bear against said support in the event of said screws rupturing.

Most advantageously, the radial clearance is calibrated so as to avoid friction between the shaft and other elements, whether stationary or moving.

Preferably, the second bearing includes an outer ring which presents an outwardly-directed radial annular flange that is pressed against a side face of the annular support by the fusible screws.

According to a second advantageous characteristic of the invention, the outer ring is maintained centered in the bore of the annular support by a plurality of studs extending parallel to the shaft, said studs being calibrated to shear in the event of the second bearing becoming uncoupled.

Preferably, the studs are provided on the annular support and extend from the periphery of the flange.

According to another advantageous characteristic of the invention, means are provided to prevent the outer ring from turning in the event of the second bearing becoming uncoupled.

Advantageously, the means for preventing the outer bearing from turning in the event of uncoupling comprise at least one pin anchored in the annular support passing with clearance through an orifice formed in the flange.

Most advantageously, that pin includes a pin head bearing against the outside face of the flange so as to prevent the second bearing from moving axially in the event of the second bearing becoming uncoupled.

Thus, in the event of uncoupling, the outer ring comes to bear against the periphery of the bore, and is prevented from turning by the pins which also prevent the outer ring of the second bearing from moving axially.

Other advantages and characteristics of the invention will appear on reading the following description given by way of non-limiting example and with reference to the accompanying drawings, in which.

Figure 1:
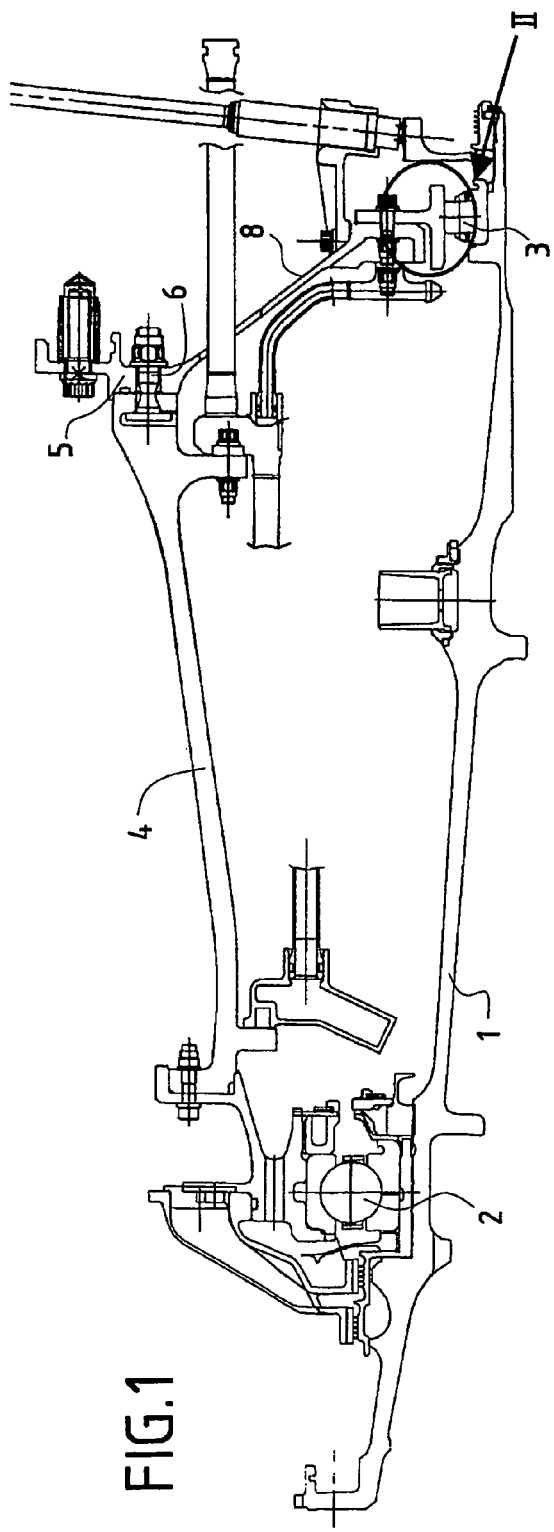
FIG. 1 is a general view of the invention.

FIG. 1 shows the front end of a shaft 1 of a low-pressure turbine of a bypass turbojet of axis X, which shaft is supported by a front bearing 2 and a rear bearing 3. The shaft 1 supports, cantilevered out in front of the front bearing 2, a fan of axis X (not shown in the drawings), and it is supported at its rear end by a third bearing that is not shown in the drawings.

The front bearing 2 is carried by a casing 4 which surrounds the shaft 1 and which extends rearwards from the front bearing 2 to a stator structure 5, to which it is united by a plurality of screws 6 disposed parallel to the axis X, and which are fusible in traction. Each of these screws 6 has a middle portion of small section which ruptures when the front bearings 2 is subjected to cyclical loads in the event of an unbalance appearing, due to a blade of the fan rupturing or becoming significantly deformed.

The rear bearing 3 is disposed in a bore 7 of axis X in a rigid support 8, which is fixed to the stator structure 5, or which is integrated in the stator structure 5, and it is fastened to said support 8 by means of screws 9 of axis X that are suitable for breaking in shear when the rear bearing 3 is subjected to large cyclical loads.

Figure 2:
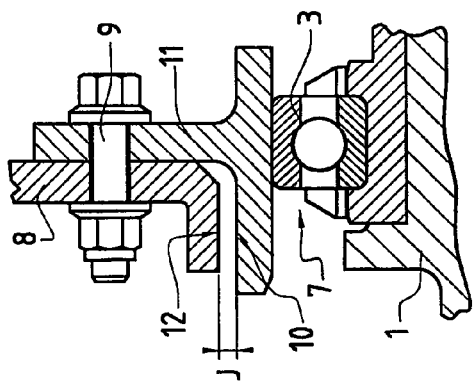
FIG. 2 shows, on a larger scale, how the rear bearing of the shaft is mounted.

As shown in FIG. 2, the bore 7 of the support 8 is of a diameter greater than the outside diameter of the outer peripheral element 10 of the rear bearing 3, this outer peripheral element 10 presenting an outwardly-directed radial annular flange 11 pressed against a side face of the support 8 by the screws 9.

There thus exists radial clearance J between the outer peripheral wall 10 and the radially-inner wall 12 of the support 8 that defines the bore 7.

In the event of the screws 9 rupturing in shear the radial travel of the rear bearing 3 is defined by the radial clearance J, the outer peripheral wall 10 of the rear bearing 3 then coming to bear against the radially-inner wall 12 of the support 8.

When the fan creates a large amount of unbalance, the front bearing 2 is subjected to cyclical loads, which are compensated by axial forces on the screws 6 that are fusible in traction, which break one after another after a very small number of revolutions of the shaft 1. The front bearing 2 no longer carries the fan, and the rear bearing 3 is subjected in turn to cyclical loads that can cause the screws 9 that are fusible in shear to rupture. However, the rear bearing 3 is maintained pressing radially against the radially-inner wall 12 of the support 8.

The clearance J is calibrated in such a manner that the shaft 1 of the low-pressure turbine does not rub against any stationary or moving elements of the turbojet, and in particular does not rub against the high-pressure shaft which connects the high-pressure turbine to the high-pressure compressor, which shaft is coaxial around the low-pressure shaft 1, and turns at a significantly greater speed.

The clearance J may be limited to 4 millimeters (mm), for example, and is preferably limited to 3 mm, so as to reduce very greatly any risk of contact between the shafts when the turbojet is operating at high speed, and to reduce forces when it is operating at low speed.

Figure 3:
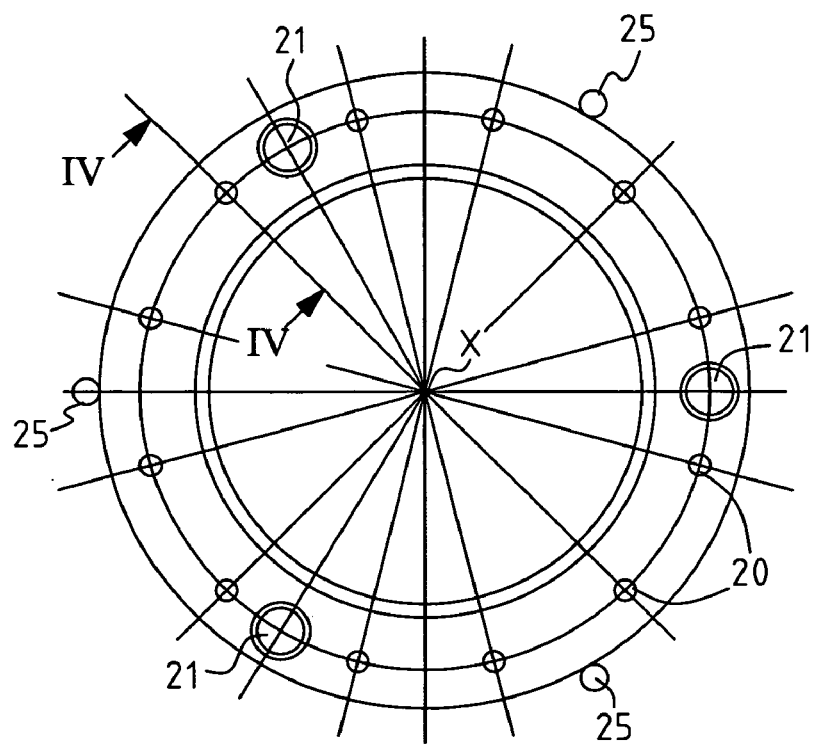
FIG. 3 is a front view of the outer ring in a preferred embodiment of the invention.
Figure 4:
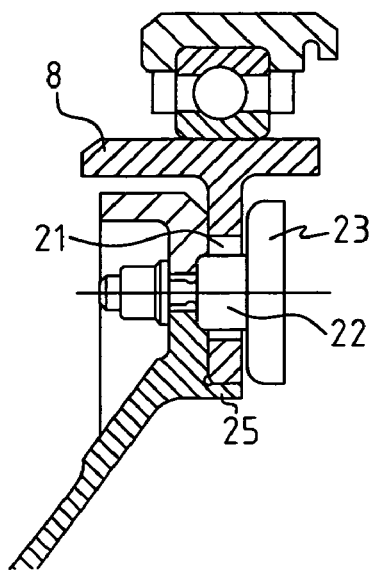
FIG. 4 shows, likewise on a larger scale, how the rear bearing of the shaft is mounted, this figure being in section on line IV-IV of FIG. 3.

Thus, as shown in FIG. 3, the radial annular flange 11 of the peripheral element 10, which in fact constitutes the outer ring of the second bearing 3, has a plurality of bores 20, e.g. 12 bores, for passing fusible screws 9. The flange 11 also has three through orifices 21 which are preferably circular and which are regularly distributed around the axis X of the shaft. These orifices 21 are for receiving with suitable clearance pins 22 that are anchored in the annular support 8, as shown in FIG. 4, so as to prevent the outer ring 10 from turning in the event of the second bearing 3 becoming uncoupled, while still allowing the outer ring 10 to bear against the radially-inner wall 12 of the support 8. Each pin 22 has a pin head 23 at its free end which is pressed lightly against the outer front face of the annular flange 11 so as to prevent the second bearing 3 from moving axially while still leaving a certain amount of radial travel available for the second bearing 3.

Reference 25 designates a stud secured to the annular support 8 and projecting from the periphery of the flange 11. The annular support 8 preferably has three studs 25 regularly distributed around the periphery of the flange, which studs serve to center the outer ring 10 in the bore 7 during assembly. These studs 25 are calibrated so as to be sheared after the fusible screws 9 have sheared, as soon as unbalance appears.

The invention claimed is:

1. A rotary shaft arrangement carrying equipment at one end and extending rearwards from the equipment, the shaft being supported by a first bearing behind the equipment, and by a second bearing behind the first bearing, the first bearing being carried by a casing surrounding the shaft and extending rearwards from the first bearing to a stator structure to which the casing is fastened by screws that extend parallel to the shaft and that are fusible in traction, wherein the second bearing is disposed with radial clearance in a bore of an annular support secured to the stator structure, and is fastened to said annular support by screws that are parallel to the shaft and that are fusible in shear, whereby the second bearing can bear against said support in the even of said screws rupturing.

2. An arrangement according to claim 1, wherein the radial clearance is calibrated so as to avoid friction between the shaft and other elements, whether stationary or moving.

3. An arrangement according to claim 2, wherein the radial clearance is no more than 3 mm.

4. An arrangement according to any one of claims 1 to 3, wherein the equipment is an entry fan of a turbojet.

5. An arrangement according to claim 1, wherein the second bearing includes an outer ring which presents an outwardly-directed radial annular flange that is pressed against a side face of the annular support by the fusible screws.

6. An arrangement according to claim 5, wherein the outer ring is maintained centered in the bore of the annular support by a plurality of studs extending parallel to the shaft said studs being calibrated to shear in the event of the second bearing becoming uncoupled.

7. An arrangement according to claim 6, wherein the studs are provided on the annular support and extend from the periphery of the flange.

8. An arrangement according to claim 7, wherein the annular support has three studs that are regularly distributed around the axis of the bore.

9. An arrangement according to claim 5, further comprising means for preventing the outer ring from turning in the event of the second bearing becoming uncoupled.

10. An arrangement according to claim 9, wherein the means for preventing the outer ring from turning in the event of uncoupling comprise at least one pin anchored in the annular support passing with clearance through an orifice formed in the flange.

11. An arrangement according to claim 10, wherein the pin includes a pin head bearing against an outside face of the flange so as to prevent the second bearing from moving axially in the event of the second bearing becoming uncoupled.

12. An arrangement according to claim 10, comprising three pins that are regularly distributed around the axis of the bore.

13. A turbojet comprising an arrangement according to claim 1.

* * * * *